United States Patent
Tsai et al.

(10) Patent No.: US 9,048,750 B2
(45) Date of Patent: Jun. 2, 2015

(54) ACTIVE BUCK POWER FACTOR CORRECTION DEVICE

(75) Inventors: Wen-Tien Tsai, Pingtung County (TW); Ching-Ran Lee, Kinmen County (TW); Po-Yen Chen, Taipei (TW); Ching-Tsai Pan, Hsinchu (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 293 days.

(21) Appl. No.: 13/435,777

(22) Filed: Mar. 30, 2012

(65) Prior Publication Data

US 2013/0169242 A1    Jul. 4, 2013

(30) Foreign Application Priority Data

Jan. 3, 2012 (TW) .............................. 101100158 A

(51) Int. Cl.
| | |
|---|---|
| *G05F 5/00* | (2006.01) |
| *H02M 1/42* | (2007.01) |
| *H02M 3/158* | (2006.01) |

(52) U.S. Cl.
CPC .......... *H02M 1/4225* (2013.01); *H02M 3/1582* (2013.01); *Y02B 70/126* (2013.01)

(58) Field of Classification Search
USPC ......... 323/222, 205, 232, 259, 207, 225, 271, 323/282, 284, 285; 363/90, 95, 97
See application file for complete search history.

(56) References Cited

U.S. PATENT DOCUMENTS

| | | | |
|---|---|---|---|
| 6,348,781 B1 | 2/2002 | Midya et al. | |
| 6,690,143 B2 * | 2/2004 | Lin et al. ....................... | 323/222 |
| 7,719,248 B1 | 5/2010 | Melanson | |
| 7,821,237 B2 | 10/2010 | Melanson | |
| 2003/0107354 A1 | 6/2003 | Lin et al. | |
| 2010/0061122 A1 | 3/2010 | Okubo et al. | |
| 2010/0123448 A1 | 5/2010 | Neidorff et al. | |

FOREIGN PATENT DOCUMENTS

| | | |
|---|---|---|
| CN | 1578078 A | 2/2005 |
| CN | 101282083 | 10/2008 |

(Continued)

OTHER PUBLICATIONS

Japan Patent Office, "Office Action", Sep. 24, 2013.

(Continued)

*Primary Examiner* — Adolf Berhane
*Assistant Examiner* — Afework Demisse
(74) *Attorney, Agent, or Firm* — WPAT, PC; Justin King

(57) ABSTRACT

The present disclose relates to a power active buck power factor correction device, comprising: a AC source; a rectifying device coupled to the AC source for receiving and rectifying the AC source so as to generate an input voltage; a first converting device coupled to the assistance device for receiving, transmitting, converting and storing energy; a load coupled to the first converting device; and an assistance device coupled to the first converting device for generating an assistance voltage. Specifically, the polarity of the assistance voltage is same with the input voltage, but is contrary to an output voltage, so that the first converting device may continue to work and receive an input current under the input voltage is smaller than the output voltage while the discontinue time of the input current is getting shorter so as to obtain the perfected power factor correction effect.

14 Claims, 16 Drawing Sheets

(56) References Cited

FOREIGN PATENT DOCUMENTS

| | | |
|---|---|---|
| CN | 101408789 | 4/2009 |
| CN | 201327623 | 10/2009 |
| CN | 101594053 | 12/2009 |
| CN | 101834539 | 9/2010 |
| EP | 0779700 | 6/1997 |
| JP | 09-308248 | 11/1997 |
| JP | 10-023748 | 1/1998 |
| JP | 2010068619 | 3/2010 |
| JP | 2011083092 | 4/2011 |
| TW | 200531599 | 9/2005 |
| TW | 201015816 | 4/2010 |
| TW | 201032435 | 9/2010 |
| TW | 201037946 A | 10/2010 |
| TW | 201115891 A | 5/2011 |
| TW | 201121218 | 6/2011 |
| TW | 201121367 | 6/2011 |
| TW | 201130216 A | 9/2011 |
| WO | 2007105189 | 9/2007 |
| WO | 2011083503 | 7/2011 |

OTHER PUBLICATIONS

Zhang et, al., "Bridgeless Buck-Boost PFC Converter", Retrieved from the Internet: <http://www.paper.edu.cn>.

Kevin Covi, "A Combined Buck and Boost Converter for Single-Phase Power-Factor Correction", Oct. 7, 2005, IBM Power and Cooling Technology Symposium.

Wang et, al., "A Novel Bridgeless Buck-Boost PFC Converter", 2008, pp. 1304-1308, IEEE.

Ray Ridley et, al., "Analysis and Design of a Wide Input Range Power Factor Correction Circuit for Three-Phase Applications", 1993, pp. 299-305, IEEE.

Lee, "Some of the latest technology in switching power supply BUCK mode PFC-IC ICC control method DC-DC control power MOS source pole of the flyback converter", Jul. 10, 2010, Retrieved from the Internet: <DianYuan.com>.

Power Integrations, "12 W Non-Isolated, Buck Topology, Power Factor Corrected, LED Driver Using LinkSwitch® -PH LNK405EG", Jun. 9, 2010, Retrieved from the Internet: <www.powerint.com>.

Bernard Keogh et, al., "Design Considerations for High Efficiency Buck PFC with Half-Bridge Regulation Stage", 2010, pp. 1384-1391, IEEE.

National Semiconductor, "LM5118 Wide Voltage Range Buck-Boost Controller", Apr. 30, 2008, National Semiconductor Corporation.

M.C. Ghanem et, al., "Unity Power Factor Scheme Using Cascade Converters", 1993, pp. 936-941, IEEE.

Taiwan Patent Office, "Office Action", Jun. 5, 2014.

China Patent Office, "Office Action", Sep. 11, 2014.

* cited by examiner

ACTIVE BUCK POWER FACTOR CORRECTION DEVICE

TECHNICAL FIELD

The present disclosure relates to an active buck power factor correction device, and more particularly, to an active buck power factor correction device that can be used in any kind of correction device with the output voltage lower than the peak voltage from AC source.

TECHNICAL BACKGROUND

A great number of current electrical appliances operate on direct current, and thus need alternating-direct current conversion since public electricity is alternating current. To reduce reactive power of an electronic system as well as to minimize current harmonics that cause system interference, a power factor corrector is prevailingly implemented in many electrical appliances that are required to have a high power factor and low current harmonics. A common power factor correcting circuit stereotypically adopts a boost approach, which is however set back by a limitation that a direct-current output voltage is necessarily higher than a peak value of an alternating-current input voltage. Further, although other circuits capable of outputting a lower voltage by means of buck or boost are available, these circuits suffer from drawbacks from having less satisfactory characteristics and efficiency, a large volume for a corresponding storage component, complex control means to low feasibilities.

FIG. 1A shows a boost converter circuit frequently adopted by a conventional power factor corrector, which is advantaged by having a higher power factor and simpler control means. FIG. 1B shows a schematic diagram of waveforms of an input voltage $V_s$ and a current $I_s$ of the conventional power factor corrector in FIG. 1A, where ω is an angular frequency of public electricity, and $V_m$ and $I_m$ respectively represent a voltage peak and a current peak. In an optimal situation, the power factor of the input current $I_s$ may approach 1.0. However, in the actual circuit application, the actual value of the power factor of the input current may approach above 0.98. In respect to the control of the switch element $Q_{PFC}$, the current in the store energy inductor $L_{PFC}$ is the input current $I_s$ and the charged voltage cross the strong energy inductor $L_{PFC}$ is equal to the AC source under the boundary current mode (BCM) (as shown in the equation (1)). After filtering the component of the high frequency of the input current $I_s$ the input current $I_s$ is directly proportional to the input voltage $V_s$ (as shown in the equation (2)), so as to accomplish the high power factor and perform the control of the boost power factor corrector.

$$i_{s(peak)} = i_{L_{PFC}(peak)} = \frac{\sqrt{2}\,v_s \sin\theta}{L_{PFC}} DT_s \quad (1)$$

$$i_{s(avg)} = i_{L_{PFC}(avg)} = \frac{\sqrt{2}\,v_s \sin\theta}{2L_{PFC}} DT_s \quad (2)$$

The two common methods to raise the power factor of the boost converter circuit: 1. zero-current cut and the constant on-time; 2. zero-current cut and double packets current cut-off. The two common methods both can implement the needed frequency and duty-cycle of the equation (2). Meanwhile, there are many ready-made IC accomplishing the two common methods. FIG. 1C illustrates relationship diagram among the input current $I_s$ and the inductor current $I_L$ of the boost converter circuit.

However, the limitation of the boost power factor corrector (or boost converter circuit) is that the input voltage must higher than the input voltage (peak voltage), and accompanied with a high output voltage, power components of the above conventional power factor corrector are often encountered with a higher voltage stress. In addition, for a load with a lower voltage requirement (lower than a peak voltage of the power source), the conventional boost power factor corrector, instead of directly providing an appropriate power source, is only able to provide a rated voltage needed by the load after stepping down its output voltage via a buck converting circuit, as shown in FIG. 2. Yet, the above design increases a circuit size and production costs as well as circuit power consumption, such that conversion efficiency of an overall circuit is reduced as a result.

To optimize conversion efficiency of a circuit, a power factor corrector with a design of a buck converter circuit has also been proposed, as shown in FIG. 3A. The major disadvantage of the buck power factor correction device is: the circuit can not receive the input current when the input voltage $V_i$ from the AC source is lower than the output voltage $V_o$, and this phenomena is called "dead zone", as shown in FIG. 3B. Thereby, the input current $I_s$ of the buck power factor correction device is discontinuous current, resulting in it has lower power factor and higher current resonance. Moreover, the bigger dead zone to cause the higher distortion rate and the current resonance, as shown in FIG. 3C.

Another disadvantage of the buck power factor correction device is that of complicated control manner of the switch element being difficult to achieve. This is because the inductor current of the buck power factor correction device only flows through the AC source at the charged section, as shown in the equation (3). After filtering the component of the high frequency of the input current $I_s$ the input current $I_s$ is not directly proportional to the input voltage $V_s$ (as shown in the equation (4)). At present, there is no the ready-made ICs or the control circuits accomplishing and overcoming the advantages of the buck power factor correction device.

$$i_{s(peak)} = i_{L_{PFC}(peak)} = \frac{\left(\sqrt{2}\,v_s \sin\theta - V_o\right)}{L_{PFC}} DT_s \quad (3)$$

$$i_{s(avg)} = i_{L_{PFC}(avg)} = \frac{\left(\sqrt{2}\,v_s \sin\theta - V_o\right)}{2L_{PFC}} D^2 T_s \quad (4)$$

There is also a buck-boost converter circuit (as shown in FIG. 4) or a fly-back converter circuit (as shown in FIG. 5) for serving as a power factor corrector. The two types of converting circuits above although indeed achieve a large power factor, due to the fact that the current path in converting circuits does not allow energy from the power source to directly charge the direct-current link capacitor, they are both disadvantaged by having a larger storage requirement for the inductor, a larger volume and poorer efficiency caused by magnetic energy loss.

There is yet another power factor corrector formed by integrating a boost converter circuit and a buck converter circuit, as shown in FIG. 6. An active switch transistor Q1 performs buck conversion when an active switch transistor Q2 is off; the active switch transistor Q2 performs boost conversion when the active switch transistor Q1 is on. However, unless being implemented in a customized integrated for a specific use, such design is extreme complex and is rather highly unfeasible and unpractical.

TECHNICAL SUMMARY

In an embodiment, the present disclosure provides a power active buck power factor correction device, comprising: a AC source; a rectifying device coupled to the AC source for receiving and rectifying the AC source so as to generate an input voltage; a first converting device coupled to the rectifying device for receiving, transmitting, converting and storing energy so as to generate an output voltage; a load coupled to the first converting device; and an assistance device coupled to the first converting device for generating an assistance voltage. Specifically, the polarity of the assistance voltage is same with the input voltage, but is contrary to an output voltage, so that the first converting device may continue to work and receive an input current under the input voltage is smaller than the output voltage while the discontinue time of the input current is getting shorter so as to obtain the perfected power factor correction effect.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1A:
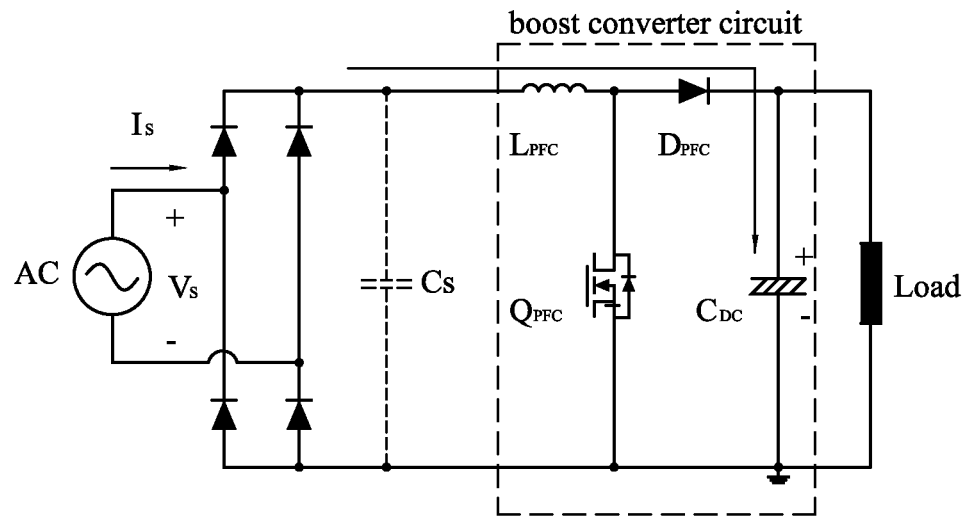
FIG. 1A is a boost converter circuit generally adopted in a conventional power factor corrector.
Figure 1B:
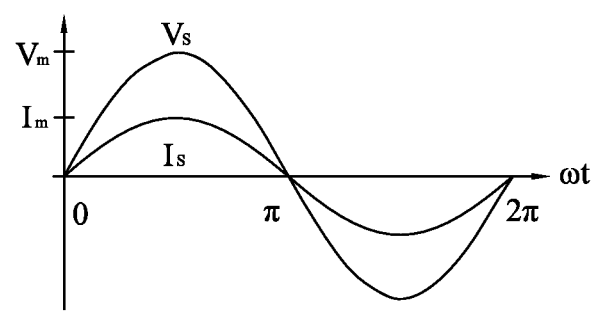
FIG. 1B is a schematic diagram of waveforms of an input voltage Vs and a current Is of the conventional power factor corrector in FIG. 1A.
Figure 1C:
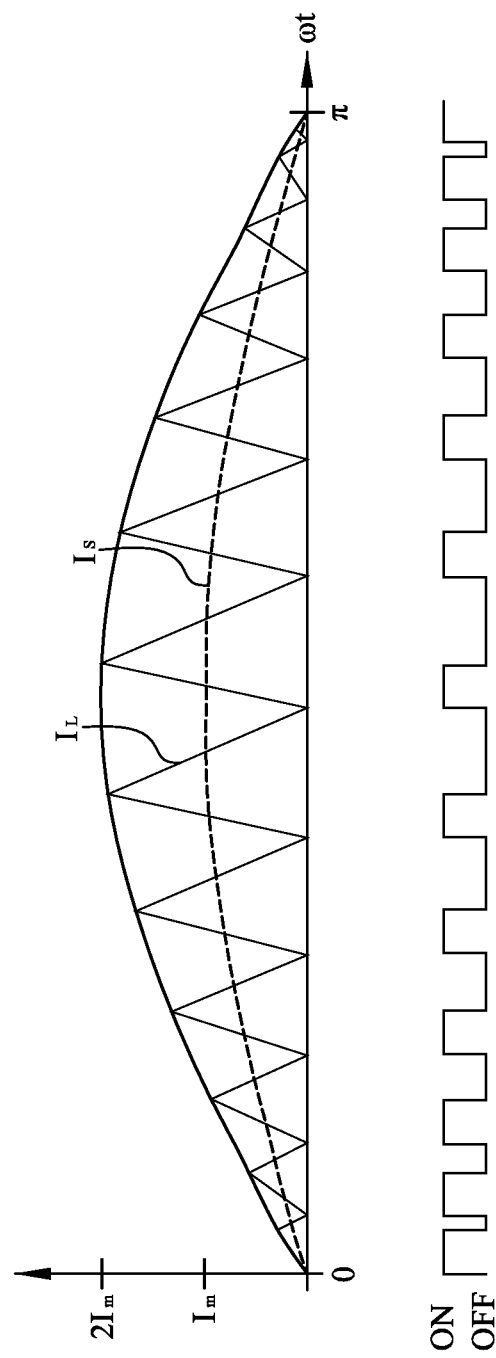
FIG. 1C illustrates relationship diagram among the boost converter circuit, the input current $I_s$ and the inductive current $I_L$.
Figure 2:
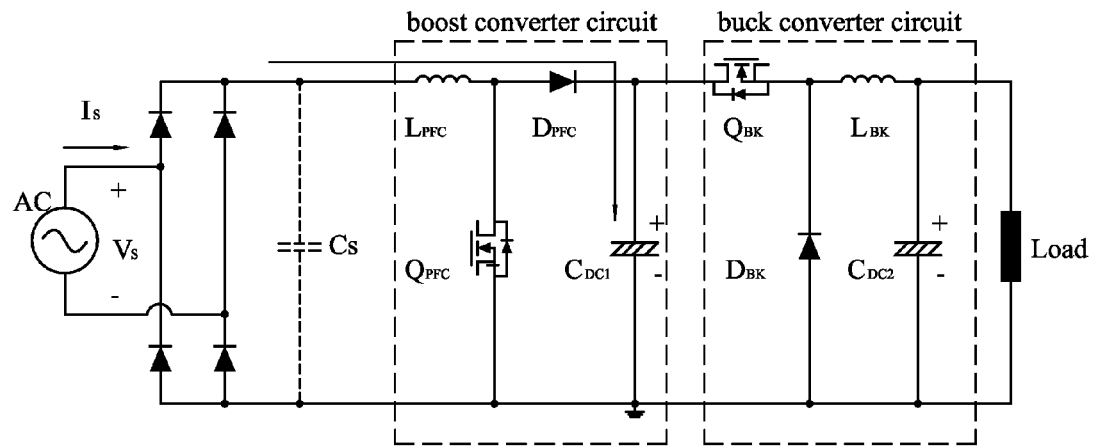
FIG. 2 is a conventional power factor corrector comprising a two-order boost and buck converter circuits.
Figure 3A:
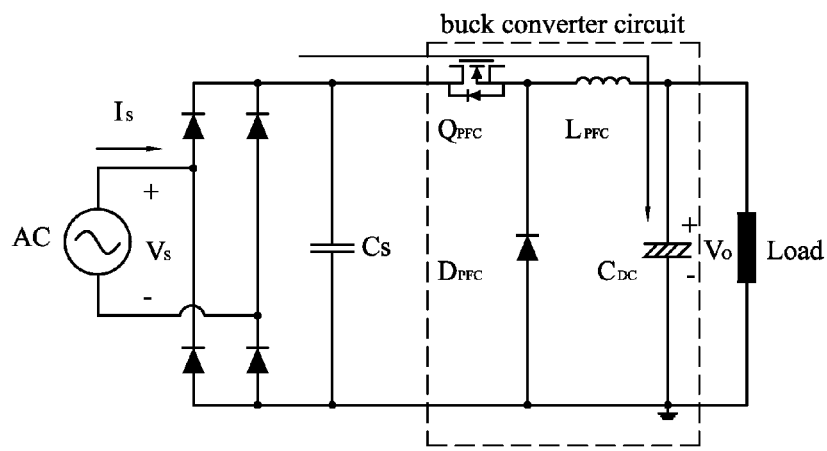
FIG. 3A is a conventional power factor corrector comprising a buck converter circuit.
Figure 3B:
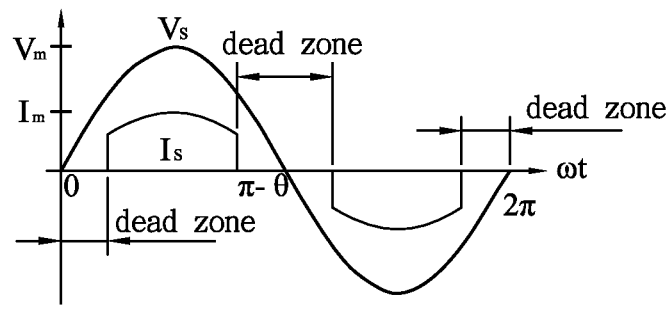
FIG. 3B is a schematic diagram of waveforms of an input voltage Vs and a current Is of the conventional power factor corrector in FIG. 3A.
Figure 3C:
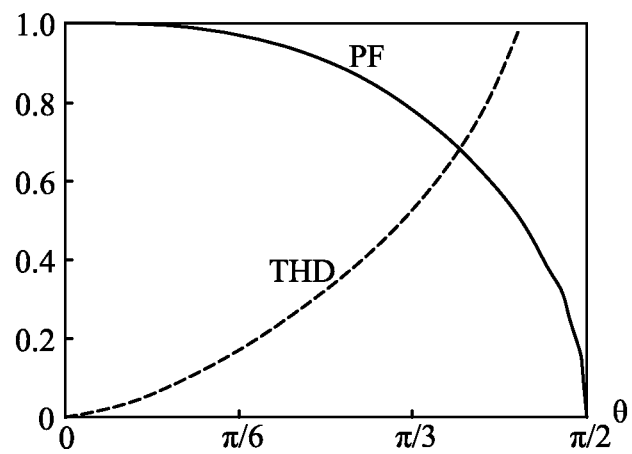
FIG. 3C illustrates relationship diagram between the ideal power factor and the distortion ratio of the current resonance of the conventional power factor corrector in FIG. 3A.
Figure 4:
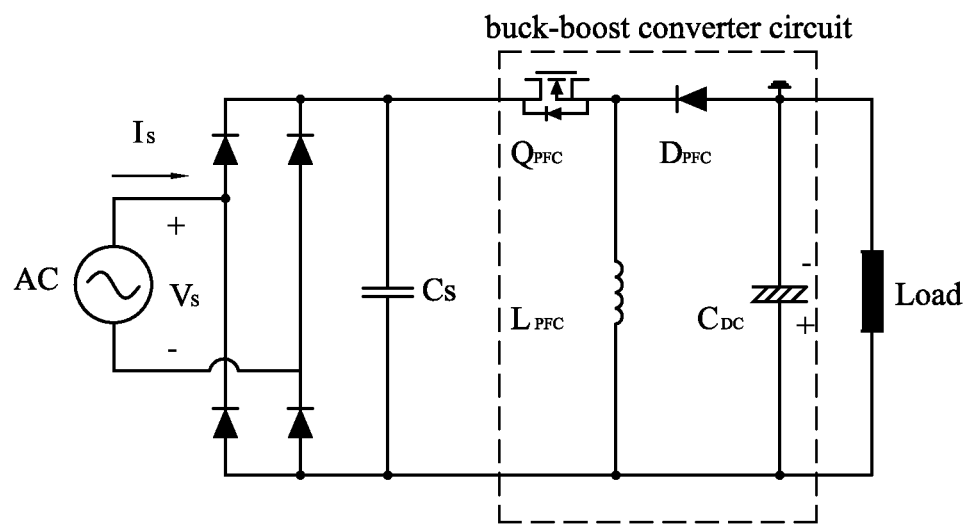
FIG. 4 is a conventional power factor corrector comprising a buck-boost converter circuit.
Figure 5:
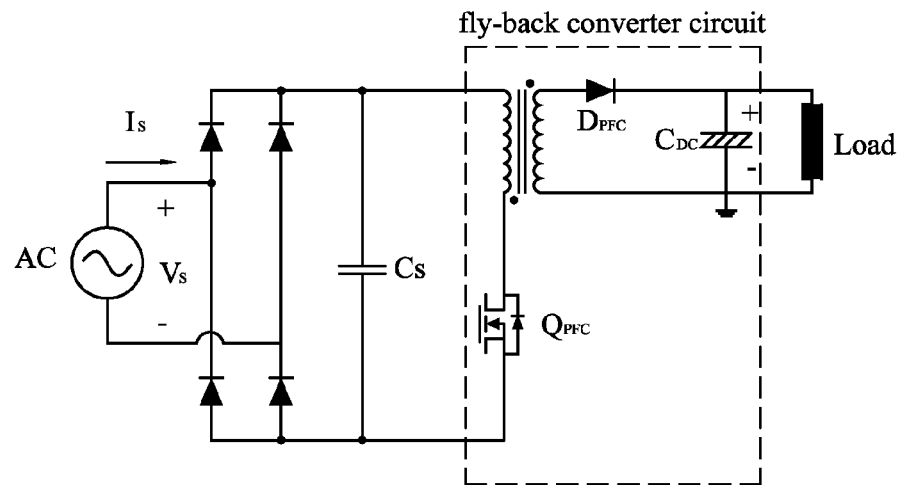
FIG. 5 is a conventional power factor corrector comprising a fly-back converter circuit.
Figure 6:
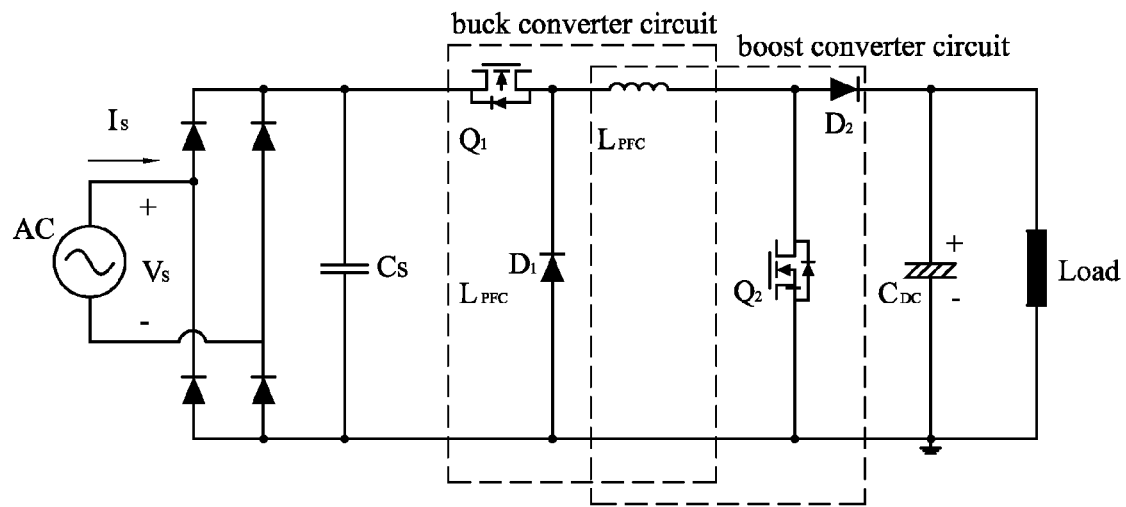
FIG. 6 is a conventional power factor corrector integrating a boost and buck converter circuits.
Figure 7:
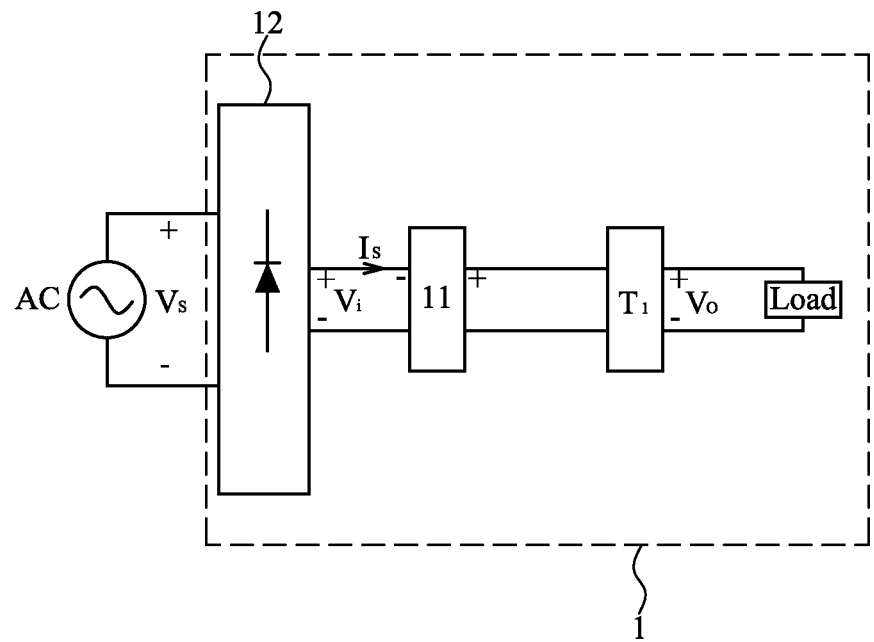
FIG. 7 illustrates an active buck power factor correction device 1 according to one embodiment of the present disclosure.

FIG. 7 illustrates an active buck power factor correction device 1 according to one embodiment of the present disclosure. The active buck power factor device 1 comprises: an assistance device 11 and a first converting device $T_1$. The assistance device 11 is used for generating an assistance voltage. The first converting device $T_1$ is coupled to the assistance device 11 for transferring, storing and converting energy. Specifically, polarity of the assistance voltage is contrary to an output voltage $V_o$. The active buck power factor device 1 further comprises a rectifying device 12, which is coupled to the assistance device 11 for receiving and rectifying a source so as to generate an input voltage $V_i$, and a load, which is coupled to the first converting device $T_1$, and the polarity of the assistance voltage is same with an input voltage $V_i$ so as to decrease the discontinuous time of the input current $I_s$. Additionally, the first converting device $T_1$ may be a buck power factor correction device.

In the embodiment, the assistance voltage is serially coupled to the path in which the input current flows, and the polarity of the assistance voltage is same with the input voltage $V_i$ so as to decrease the discontinuous time of the input current $I_s$. The assistance device 11 utilizes an assistance capacitor to be an assistance voltage element, and the designed assistance coil is coupled to the storing energy inductor in the first converting device $T_1$ so as to release the energy in the storing energy inductor to the output capacitor and simultaneously, the assistance capacitor is charged via the assistance coil, resulting in the polarity of the voltage cross the assistance capacitor is same with the input voltage $V_i$. Further, the coil number of the assistance coil is same with the assistance inductor, and simultaneously, the voltage cross the assistance capacitor is equal to the output voltage $V_o$ so as to remove the dead zone.

Figure 8:
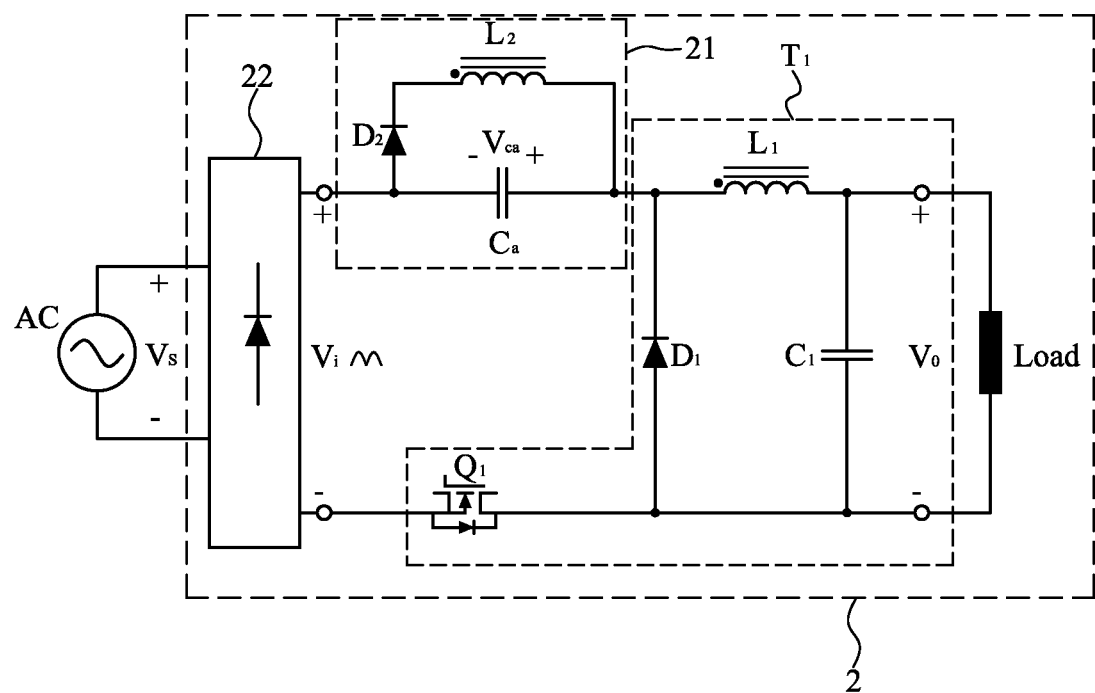
FIG. 8 illustrates one embodiment applying the structure shown in FIG. 7.

FIG. 8 illustrates one embodiment applying the structure shown in FIG. 7. The active buck power factor correction device 2 is adaptable to any kind of the power supply having the input voltage higher than the output voltage or buck power factor corrector, and the active buck power factor correction device 2 comprises: an assistance device 21 and a first converting device $T_1$. The buck power factor correction device 2 further comprises a rectifying device 22 and a load. In the embodiment, the first assistance device 21 comprises an assistance coil $L_2$, an assistance diode $D_2$ and an assistance capacitor $C_a$. The first converting device $T_1$ comprises: a storing energy inductor $L_1$, an active power switch $Q_1$, a diode $D_1$ and an output capacitor $C_1$. Specifically, the assistance coil $L_2$ in the assistance device 21 is serially coupled to the assistance diode $D_2$ and is coupled to the assistance capacitor $C_a$ in parallel. The assistance coil $L_2$ consists of one or more coils. One terminal of the diode $D_1$ is coupled to the storing energy inductor $L_1$ and another terminal thereof is coupled to the output capacitor $C_1$, and one terminal of the storing energy inductor $L_1$ is coupled to the diode $D_1$ and another terminal thereof is coupled to the output capacitor $C_1$, and one terminal of the output capacitor $C_1$ is coupled to the storing energy inductor $L_1$ and another terminal thereof is coupled to the diode $D_1$, and coupled to the load in parallel, and one terminal of the active power switch $Q_1$ is coupled to the rectifying device 22 and another terminal is coupled to the output capacitor $C_1$.

Figure 9A:
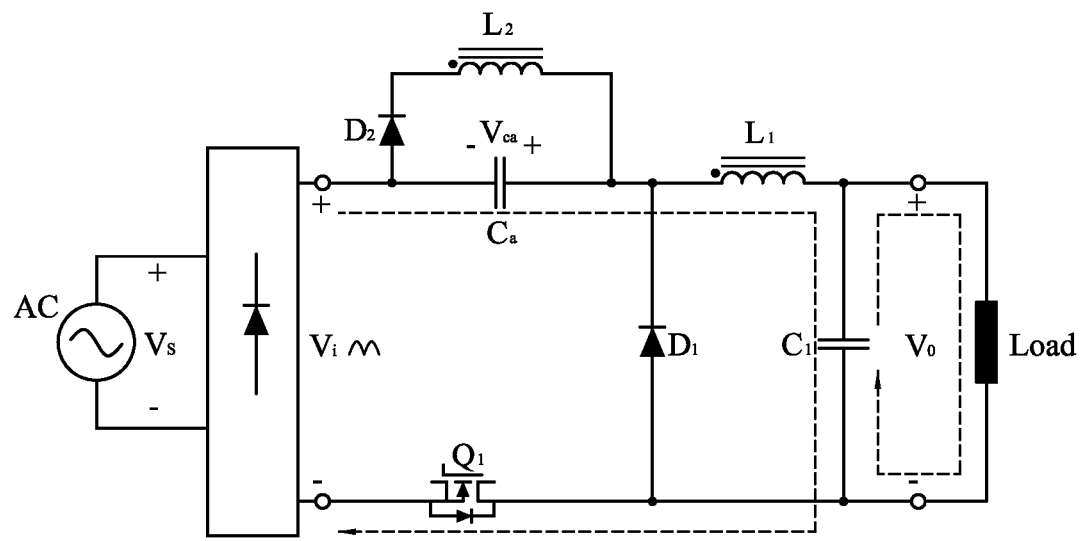
FIGS. 9(A), 9(B), 9(C) and 9(D) illustrate circuit operations of the buck power factor correction device in FIG. 8.

Regarding to the circuit operations of the active buck power factor correction device 2 are as depicted bellows:

(1) Mode 1: $Q_1$ ON, $D_1$ OFF, $D_2$ OFF. Under the mode 1, when the active power switch $Q_1$ is ON, the input voltage $V_i$ is added to the voltage $V_{ca}$ (the assistance voltage) cross on the assistance capacitor $C_a$, and simultaneously, the storing energy inductor $L_1$ and the output capacitor $C_1$ are charged. The current on the storing energy inductor $L_1$ is increased, and the voltage $V_{ca}$ (the assistance voltage) on the assistance capacitor $C_a$ is decreased. This section is continuously operated until the active power switch is turned to OFF, and the operation is shown in FIG. 9(A).

Figure 9B:
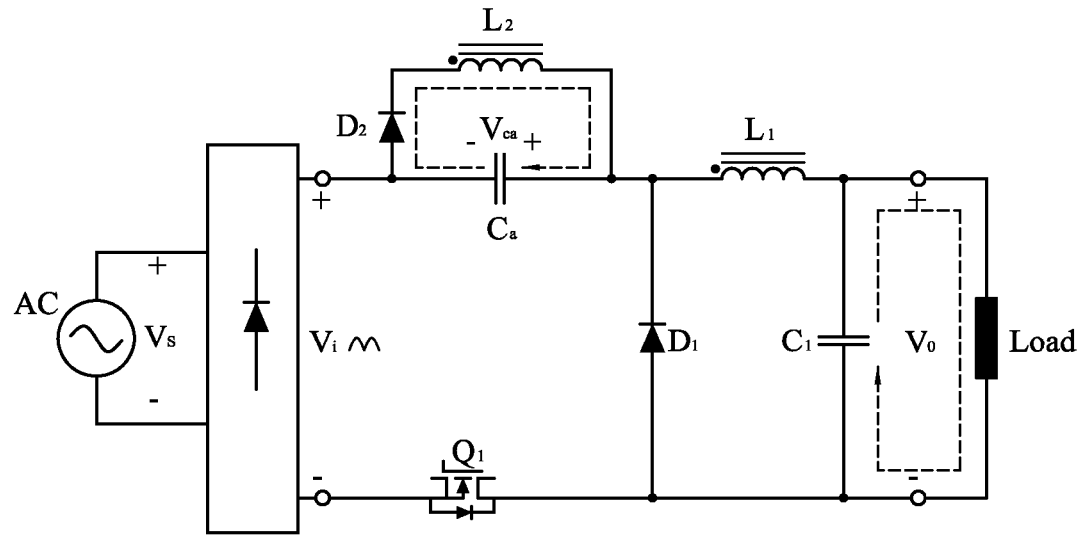

(2) Mode 2: $Q_1$ OFF, $D_1$ OFF, $D_2$ ON. Under the mode 2, after the active power switch $Q_1$ is OFF, the energy in the storing energy inductor $L_1$ is released. Since the storing energy inductor $L_1$ is coupled to the assistance coil $L_2$ each other, a coupling inductor is formed and it has the common store energy. Thereby, the stored energy in the inductor may be respectively released from the $L_1$ and $L_2$. In the embodiment, the coil number of the storing energy inductor $L_1$ is same with the assistance coil $L_2$, so the voltage cross on the storing energy inductor $L_1$ is equal to the assistance coil $L_2$. Because the voltage $V_{ca}$ in the assistance capacitor $C_a$ is decreased under mode 1, the voltage $V_{ca}$ is smaller than the output voltage $V_o$ ($V_{ca} < V_o$), and meanwhile, the assistance diode $D_2$ is firstly turned ON. The energy in the assistance coil $L_2$ is released via the assistance diode $D_2$ for charging the energy to the assistance capacitor $C_a$, so the voltage $V_{ca}$ is increased and the voltage of the storing energy inductor $L_1$ is latched to $V_{ca}$, resulting in the diode $D_1$ is reverse biased and is turned OFF. This section is continuously operated until $V_{ca} = V_o$, and the operation is shown in FIG. 9(B).

Figure 9C:
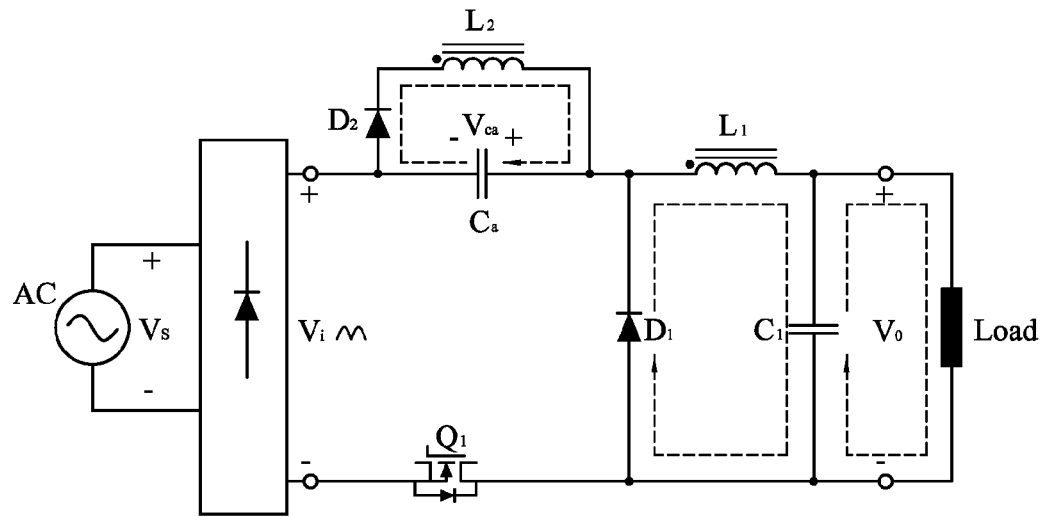

Mode 3: $Q_1$ OFF, $D_1$ ON, $D_2$ ON. Under mode 3, when the voltage $V_{ca}$ of the storing energy $L_1$ is equal with the output voltage $V_o$, the diode $D_1$ is forward biased and is turned ON, and the energy in the storing energy inductor $L_1$ is discharged to the output capacitor $C_1$ via the diode $D_1$, and The energy in the assistance coil $L_2$ is released via the assistance diode $D_2$ for charging the energy to the assistance capacitor $C_a$, until the energy is completely released from the storing energy inductor $L_1$ and the assistance coil $L_2$ and the current is dropped to zero. The circuit operation in this section is shown in FIG. 9(C).

Figure 9D:
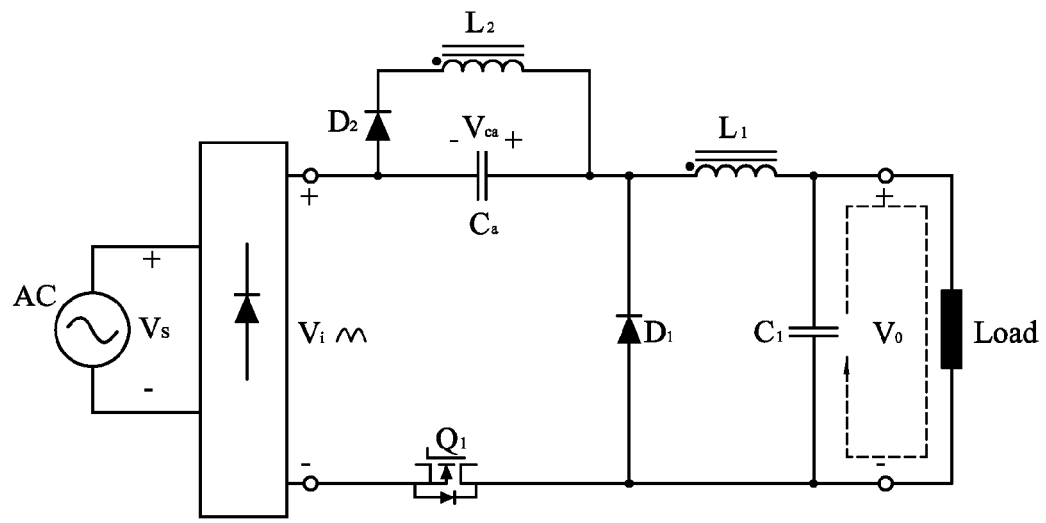

Mode 4: $Q_1$ OFF, $D_1$ OFF, $D_2$ OFF. Under mode 4, after the energy is completely released from the storing energy inductor $L_1$ and the assistance coil $L_2$, the current is dropped to zero, the diode $D_1$ and the assistance diode $D_2$ are turned to OFF until the active power switch $Q_1$ is turned to ON and the state of the circuit regains the Mode 1. The circuit operation in this section is shown in FIG. 9(D). In the embodiment, the energy that the load needs is proved by the output capacitor $C_1$.

Figure 10:
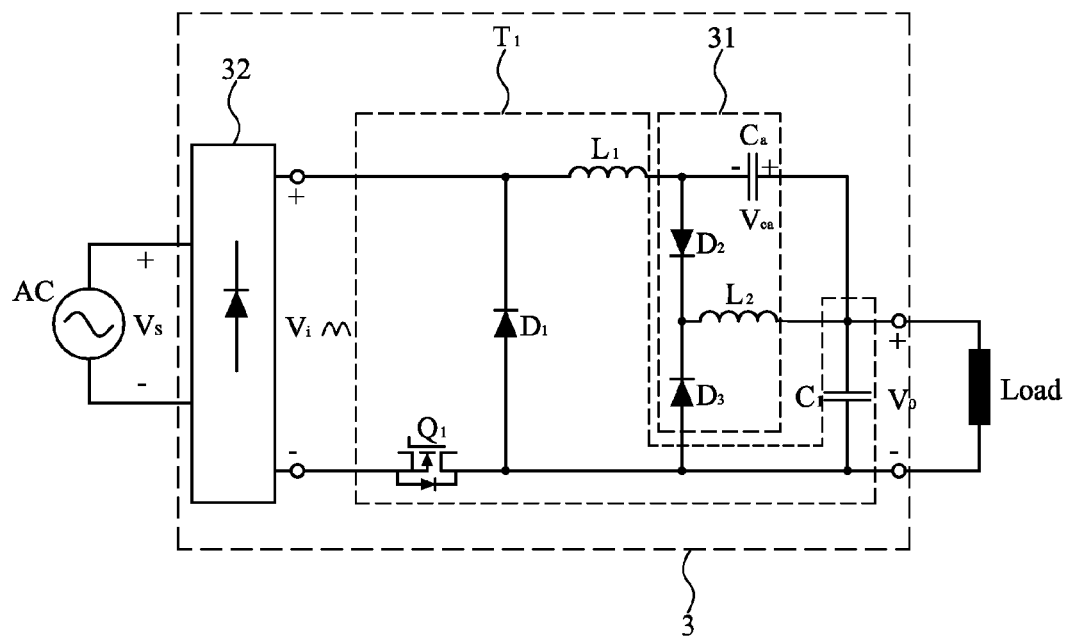
FIG. 10 illustrates another embodiment applying the structure shown in FIG. 7.

FIG. 10 illustrates another embodiment applying the structure shown in FIG. 7. The active buck power factor correction device 3 is adapted to any kind of the power supply having the input voltage higher than the output voltage or buck power factor corrector, and the active buck power factor correction device 3 comprises: an assistance device 31 and a first converting device $T_1$. And the active buck power factor correction device 3 further comprises a rectifying device 32 and a load. In the embodiment, the assistance device 31 comprises an assistance coil $L_2$, a first assistance diode $D_2$, a second assistance diode $D_3$ and an assistance capacitor $C_a$. The first converting device $T_1$ comprises a storing energy inductor $L_1$, an active power switch $Q_1$, a diode $D_1$, and an output capacitor $C_1$. Specifically, the first assistance diode $D_2$ is reversely coupled to the second assistance diode $D_3$, and one terminal of the first assistance diode $D_2$ is coupled to the assistance capacitor $C_a$ and another terminal thereof is coupled to the assistance coil $L_2$, and the assistance coil $L_2$ consists of one or more coils, and one terminal of the assistance coil $L_2$ is coupled to the first assistance diode $D_2$ and the second assistance diode $D_3$ and another terminal thereof is coupled to the assistance capacitor $C_a$ and the output capacitor $C_1$. And one terminal of the diode $D_1$ is coupled to the storing energy inductor $L_1$, and another terminal thereof is coupled to the active power switch $Q_1$ and the output capacitor $C_1$, and one terminal of the storing energy inductor $L_1$ is coupled to the diode $D_1$ and another terminal thereof is coupled to the assistance capacitor $C_a$, and the active buck power switch $Q_1$ is transistor, and the one terminal of the active buck power switch $Q_1$ is coupled to the rectifying device 32 and another terminal thereof is coupled to the diode $D_1$ and the output capacitor $C_1$, and one terminal of the output capacitor $C_1$ is coupled to the assistance capacitor $C_a$ and another terminal thereof is coupled to the diode $D_1$ and is coupled to the load in parallel.

Figure 11A:
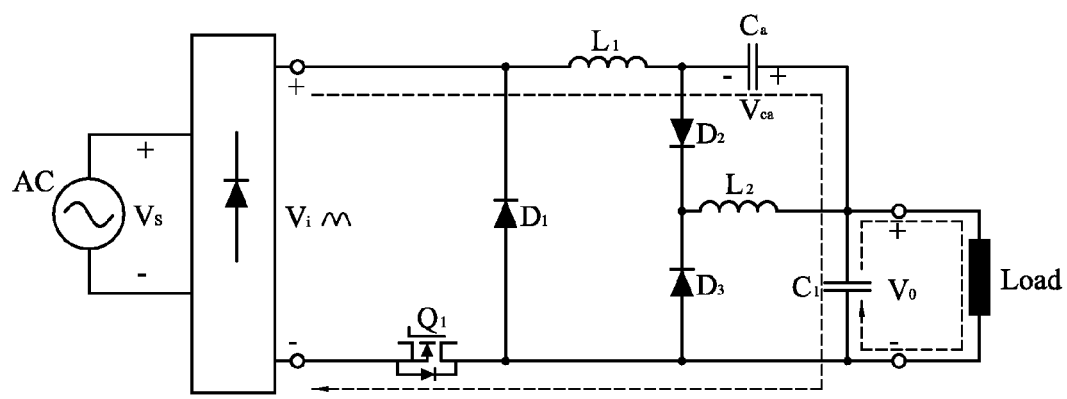
FIGS. 11(A), 11(B), 11(C), 11(D), 11(E) and 11(F) illustrate circuit operations of the buck power factor correction device in FIG. 10.

Regarding to the circuit operations of the active buck power factor correction device 3 are as depicted bellows:

(1) Mode 1: $Q_1$ ON, $D_1$ OFF, $D_2$ OFF, $D_3$ OFF. Under mode 1, when the active power switch $Q_1$ is ON, the input voltage $V_i$ is added to the voltage $V_{ca}$ (the assistance voltage) cross on the assistance capacitor $C_a$, and simultaneously, the storing energy inductor $L_1$ and the output capacitor $C_1$ are charged. The current on the storing energy inductor $L_1$ is increased, and the voltage $V_{ca}$ (the assistance voltage) on the assistance capacitor $C_a$ is decreased. This section is continuously operated until the active power switch $Q_1$ is turned to OFF, and the operation is shown in FIG. 11(A).

Figure 11B:
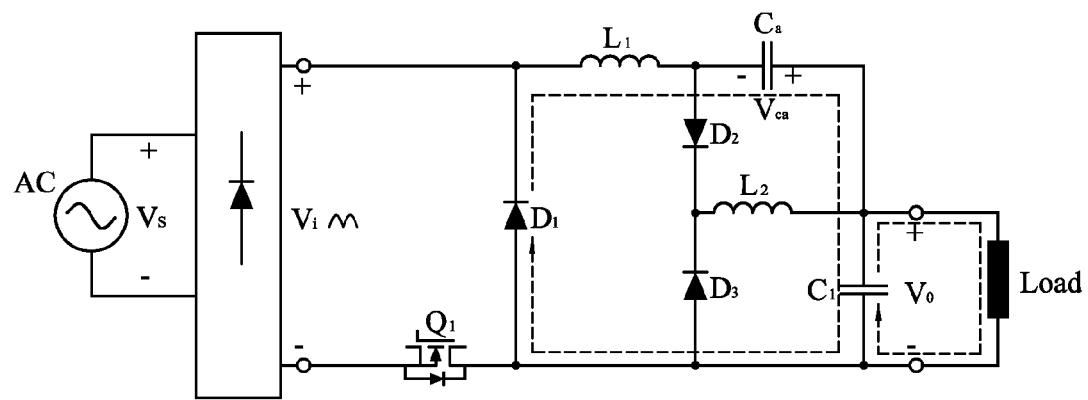

(2) Mode 2: $Q_1$ OFF, $D_1$ ON, $D_2$ OFF, $D_3$ OFF. Under mode 2, after the active power switch $Q_1$ is OFF, the energy in the storing energy inductor $L_1$ is released, and the current in the storing energy inductor $L_1$ and the voltage $V_{ca}$ (the assistance voltage) cross on the assistance capacitor $C_a$ are continuously decreased. This section is continuously operated until $V_{ca} = 0$, and the operation is shown in FIG. 11(B).

Figure 11C:
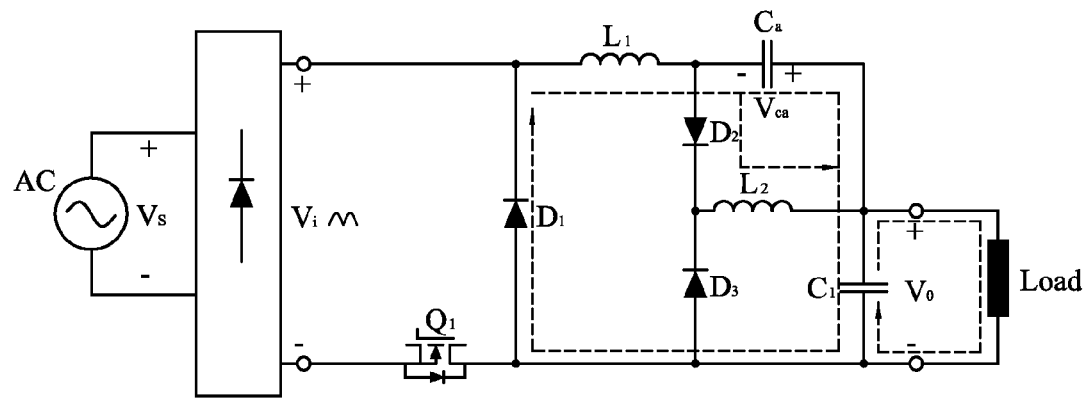

(3) Mode 3: $Q_1$ OFF, $D_1$ ON, $D_2$ ON, $D_3$ OFF. Under mode 3, when the voltage $V_{ca}$ is dropped to zero, the first assistance diode $D_2$ is forward biased and the current of the storing energy inductor $L_1$ simultaneously flows through the assistance capacitor $C_a$ and the first assistance diode $D_2$ and discharges the energy to the output capacitor $C_1$ until the energy in the storing energy inductor $L_1$ is completely released and the current in the storing energy inductor $L_1$ is dropped to zero. In this section, the assistance capacitor $C_a$ is reversely charged, and the voltage $V_{ca}$ cross the assistance capacitor $C_a$ is turned to negative, and the current of the assistance coil $L_2$ is increased. The circuit operation of this section is shown in FIG. 11(C).

Figure 11D:
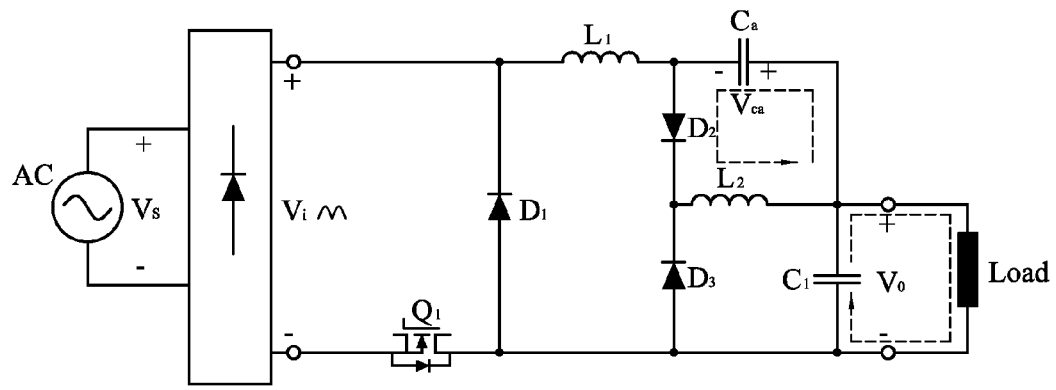

(4) Mode 4: $Q_1$ OFF, $D_1$ OFF, $D_2$ ON, $D_3$ OFF. Under mode 4, after the energy in the storing energy inductor $L_1$ is completely released, the diode $D_1$ is turned OFF. Because the voltage $V_{ca}$ cross on the assistance capacitor $C_a$ is negative, the first assistance diode $D_2$ maintains ON, and a resonance circuit is formed by the assistance capacitor $C_a$ and the assistance coil $L_2$. In this section, the energy in the assistance capacitor $C_a$ is transferred to the assistance coil $L_2$, so the current in the assistance coil $L_2$ is increased until the energy in the assistance capacitor $C_a$ is completely released and the voltage $V_{ca}$=0. Afterward, the energy in the assistance coil $L_2$ is transferred to the assistance capacitor $C_a$, and meanwhile, the current of the assistance coil $L_2$ is decreased and the voltage $V_{ca}$ cross on the assistance capacitor $C_a$ is increased. In the section, when $V_{ca}=V_o$, the circuit operation enters the mode 5. This circuit operation of this section is shown in FIG. 11(D).

Figure 11E:
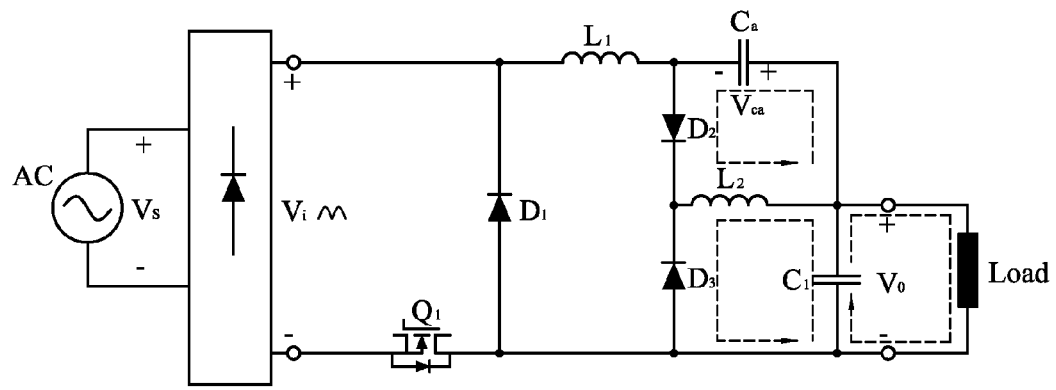

(5) Mode 5: $Q_1$ OFF, $D_1$ OFF, $D_2$ ON, $D_3$ ON. Under mode 5, when $V_{ca}=V_o$, the second assistance diode $D_3$ is turned to ON, the current in the assistance coil $L_2$ flows through the output capacitor $C_1$ and the assistance capacitor $C_a$. Because the output capacitor $C_1$ is coupled to the assistance capacitor $C_a$ in parallel, the voltages of both are same. This section is continuously operated until the energy in the assistance coil $L_2$ is completely released, and the operation is shown in FIG. 11(E).

Figure 11F:
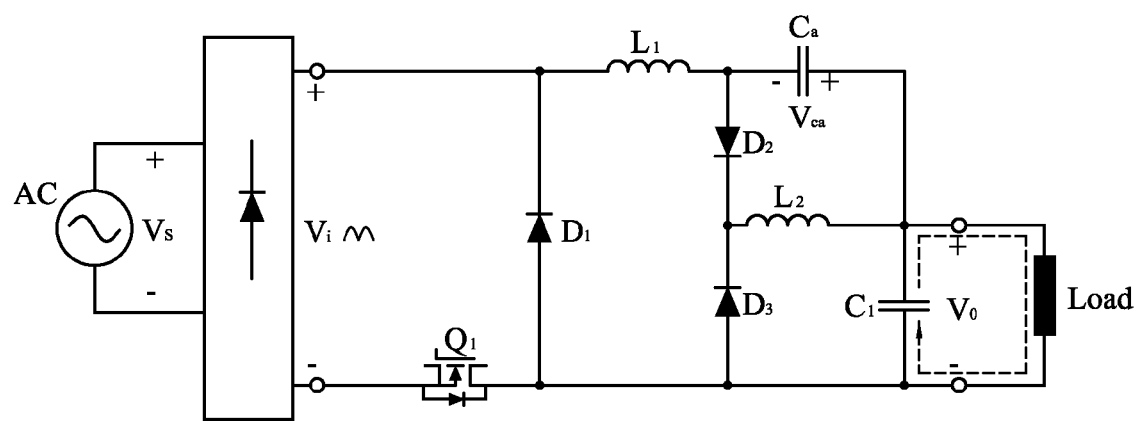

(6) Mode 6: $Q_1$ OFF, $D_1$ OFF, $D_2$ OFF, $D_3$ OFF. Under mode 6, when the energy in the assistance coil $L_2$ is completely released, the first assistance diode $D_2$ and the second assistance diode $D_3$ are turned to OFF until the active power switch $Q_1$ is turned to ON and the state of the circuit regains the Mode 1. The circuit operation in this section is shown in FIG. 11(F). In the embodiment, the energy that the load needs is proved by the output capacitor $C_1$.

Figure 12:
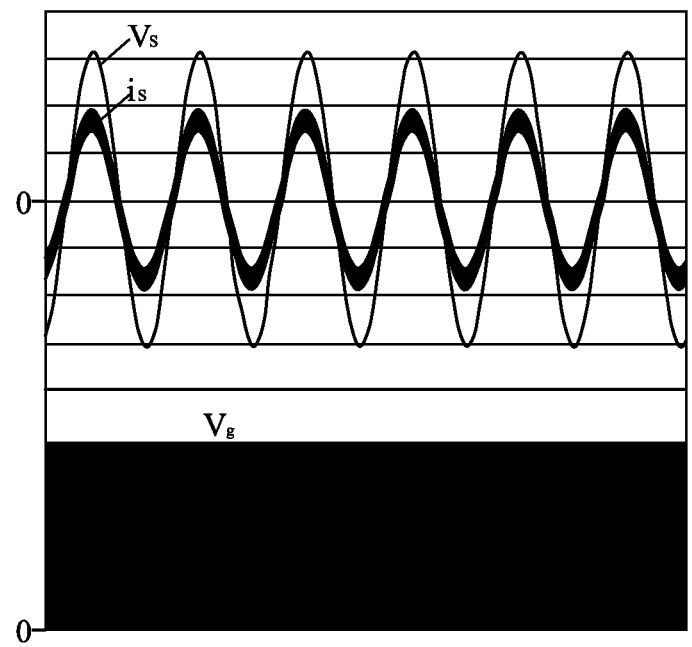
FIG. 12 illustrates the pulse width modulation (PWM) waveform diagram applying the input voltage, the input current and the high frequency switch control signal of the present disclosure.
Figure 13:
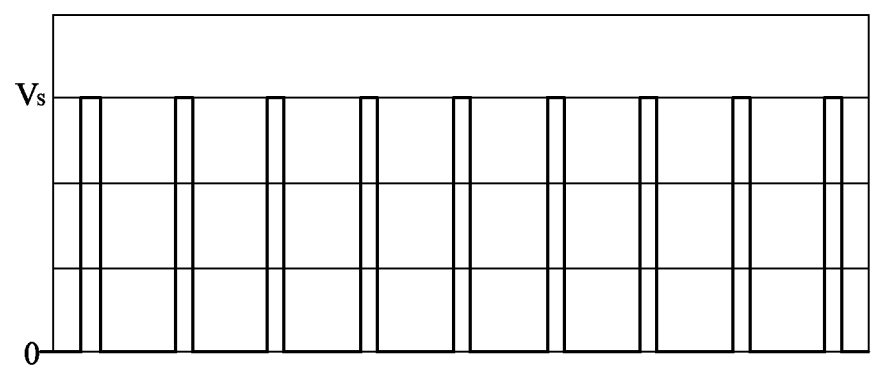
FIG. 13 illustrates expend view applying the high frequency switch control signal of the present disclosure.

FIG. 12 illustrates the pulse width modulation (PWM) waveform diagram applying the input voltage, the input current and the high frequency switch control signal of the present disclosure. FIG. 13 illustrates expand view applying the high frequency switch control signal of the present disclosure. In accordance with the FIGS. 12 and 13, it obviously appears the control signal of the active power switch $Q_1$ in the present disclosure has the fixed frequency and the duty-ratio so as to achieve the high power factor and the low harmonic distortion. Compared with the convention boost and buck power factor correctors, the control manner of the present disclosure is simple and is easy implemented.

Figure 14A:
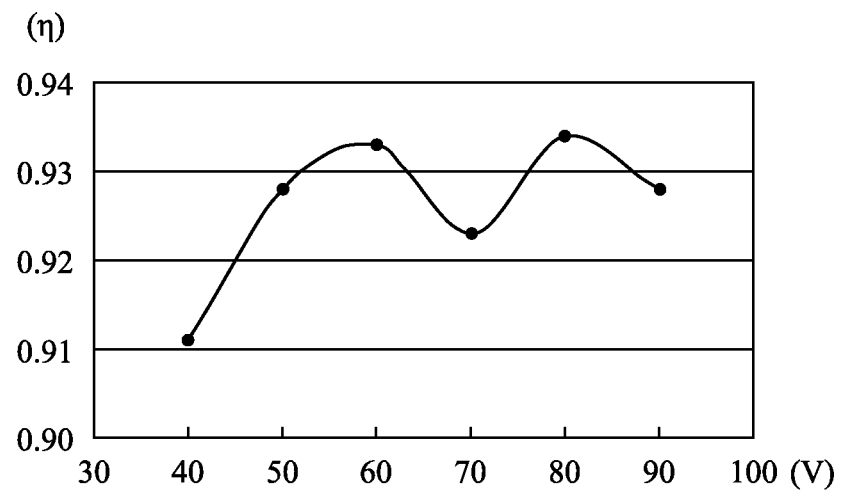
FIG. 14(A) illustrates the relationship curve diagram between the conversion efficiency (η) and the input voltage in the present disclosure.
Figure 14B:
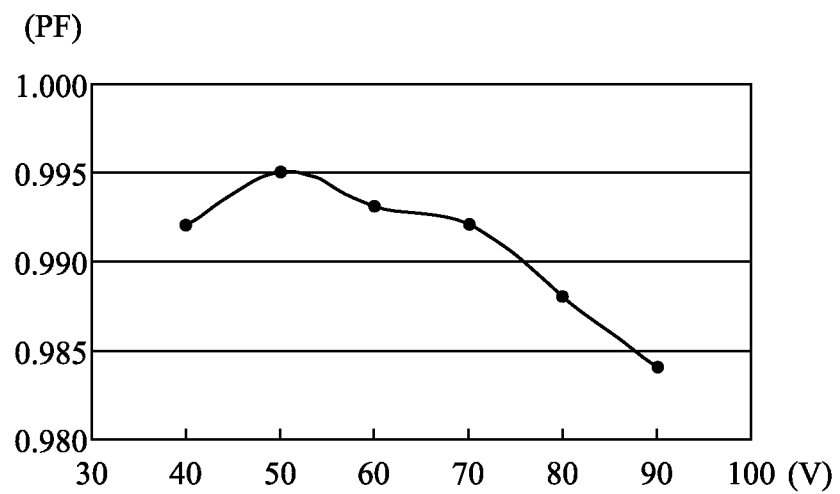
FIG. 14(B) illustrates the relationship curve diagram between the power factor (PF) and the input voltage in the present disclosure.
Figure 14C:
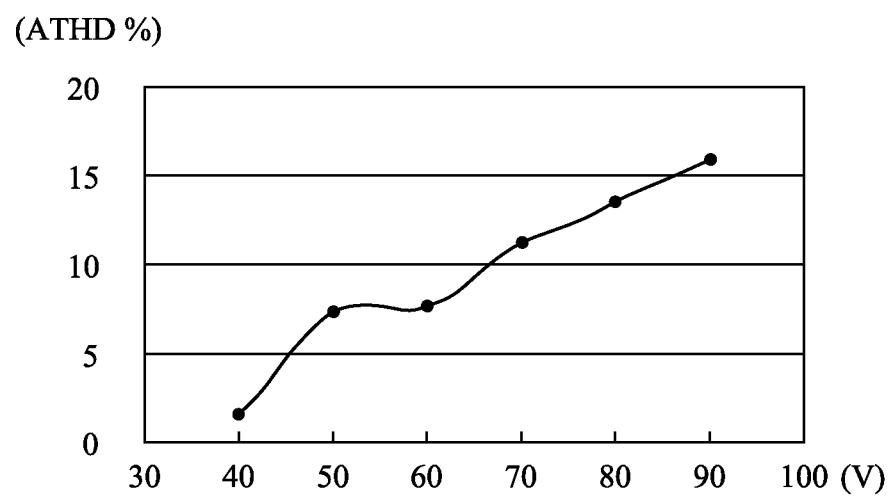
FIG. 14(C) illustrates the relationship curve diagram between the ampere total harmonic distortion (ATHD) of the circuit and the input voltage in the present disclosure.

On the other hand, when the frequency or the duty-ratio of the control signal is modulated, the output voltage is also modulated so as to maintain the perfected power factor correction. FIG. 14 illustrates changes of the conversion efficiency (η), the power factor (PF) and the ampere total harmonic distortion (ATHD) of the circuit disclosed by the present disclosure when it uses the input voltage 110V and the output power 20 W in different output voltage $V_o$. As shown in FIGS. 14(A)~(C), it obviously appears the conversion efficiency is 91~94% (see FIG. 14(A)), PF maintains above 0.98 (see FIG. 14(B)) and ATHD is 2~16% (see FIG. 14(C) when the input voltage is 40~90V in the present disclosure.

Thereby, the present disclosure not only obtains the high power factor and the low harmonic distortion, but also obtains good conversion efficiency.

The active buck power factor correction device uses a capacitor to be an assistance capacitor for adding extra driving potential to the input current, so as to solve the dead zone of the convention active buck power factor correction device. In respect to the control, it only uses the simple control manner to obtain many advantages, such as the high power factor, the low harmonic distortion and the good convention efficiency, etc. Besides, although the present disclosure merely disclose the buck power factor corrector with AC to DC, the skilled person should understand the buck power factor corrector with DC to DC is also applied in the present disclosure.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. An active buck power factor correction device, comprising:
    an assistance device, for generating a assistance voltage; and
    a first converting device, coupled to the assistance device, for transferring, storing and converting energy, wherein the first converting device is a buck power correction device, and comprises a storing energy inductor, an active power switch, a diode and an output capacitor;
    wherein a polarity of the assistance voltage is same with an input voltage, but is contrary to an output voltage; when the active power switch is ON, and the input voltage is added to the assistance voltage, and simultaneously, the storing energy inductor and the output capacitor are charged.

2. The active buck power factor correction device of claim 1, further comprising:
    a rectifying device, coupled to the assistance device, for receiving and rectifying a source so as to generate an input voltage; and
    a load, coupled to the first converting device.

3. The active buck power factor correction device of claim 2, wherein the assistance device comprises an assistance coil, an assistance diode and an assistance capacitor.

4. The active buck power factor correction device of claim 3, wherein the assistance coil is serially connected to the assistance diode, and is connected to the assistance capacitor in parallel, and the assistance coil is an inductor coil, and the assistance coil is coupled with the storing energy inductor each other.

5. The active buck power factor correction device of claim 3, wherein one terminal of the diode is coupled to the storing energy inductor and another terminal thereof is coupled to the output capacitor, and one terminal of the storing energy inductor is coupled to the diode and another terminal thereof is coupled to the output capacitor, and one terminal of the output capacitor is coupled to the storing energy inductor and another terminal is coupled to the diode and coupled to the load in parallel, and one terminal of the active power switch is coupled to the rectifying device and another terminal thereof is coupled to the output capacitor.

6. The active buck power factor correction device of claim 3, wherein the power switch is OFF, and the assistance capacitor is charged via the assistance coil so as to generate the assistance voltage having the same polarity with the input voltage.

7. The active buck power factor correction device of claim 3, wherein when the active power switch is OFF, the output capacitor and the assistance capacitor are charged by the storing energy inductor and the assistance coil, resulting in the polarity of the assistance voltage is contrary to the output voltage.

8. The active buck power factor correction device of claim 3, wherein when the coil number of the storing energy inductor is same with the assistance coil, the voltage of the assistance is equal to the output voltage.

9. The active buck power factor correction device of claim 2, wherein the assistance device comprises an assistance coil, a first assistance diode, a second assistance diode and an assistance capacitor, and the first converting device comprises a storing energy inductor, an active power switch, a diode and a output capacitor.

10. The active buck power factor correction device of claim 9, wherein the first assistance diode is reversely coupled to the second assistance diode, and one terminal of the first assistance diode is coupled to the assistance capacitor and another terminal thereof is coupled to the assistance coil, and the assistance coil is an inductor coil, and one terminal of the assistance coil is coupled to the first assistance diode and the second assistance diode and another terminal thereof is coupled to the assistance capacitor and the output capacitor.

11. The active buck power factor correction device of claim 9, wherein one terminal of the diode is coupled to the storing energy inductor and another terminal thereof is coupled to the active power switch and the output capacitor, and one terminal of the storing energy inductor is coupled to the diode and another terminal thereof is coupled to the assistance capacitor, and the active power switch is a transistor, and one terminal of the active power switch is coupled to the rectifying device and another terminal thereof is coupled to the diode and the output capacitor, and one terminal of the output capacitor is coupled to the assistance capacitor and another terminal of capacitor is coupled to the diode and is coupled to the load in parallel.

12. The active buck power factor correction device of claim 10, wherein when the active power switch is ON, the input voltage is added to the assistance voltage, and simultaneously, the storing energy inductor and the output capacitor are charged.

13. The active buck power factor correction device of claim 10, wherein when the active power switch is OFF, the energy in the storing energy inductor is released onto the assistance coil, and the output capacitor and the assistance capacitor are charged via the assistance coil, resulting in the polarity of the assistance voltage is contrary to the output voltage.

14. The active buck power factor correction device of claim 10, wherein when the coil number of the storing energy inductor is same with the assistance coil, the assistance voltage is equal to the output voltage.

* * * * *